(12) United States Patent
Soda (10) Patent No.: US 10,290,323 B2
(45) Date of Patent: May 14, 2019

(54) TRACK PLAYBACK CONTROLLING APPARATUS

(71) Applicant: CASIO COMPUTER CO., LTD., Shibuya-ku, Tokyo (JP)

(72) Inventor: Takashi Soda, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/896,606

(22) Filed: Feb. 14, 2018

(65) Prior Publication Data

US 2018/0277160 A1 Sep. 27, 2018

(30) Foreign Application Priority Data

Mar. 23, 2017 (JP) ................. 2017-056775

(51) Int. Cl.
| | | |
|---|---|---|
| H04B 1/00 | (2006.01) | |
| G11B 27/038 | (2006.01) | |
| G10H 1/00 | (2006.01) | |
| G11B 27/00 | (2006.01) | |
| H04R 3/04 | (2006.01) | |
| H04R 3/00 | (2006.01) | |
| G06F 17/00 | (2019.01) | |
| G10H 1/46 | (2006.01) | |
| G11B 20/10 | (2006.01) | |

(52) U.S. Cl.
CPC ........... *G11B 27/038* (2013.01); *G06F 17/00* (2013.01); *G10H 1/0041* (2013.01); *G10H 1/0091* (2013.01); *G10H 1/46* (2013.01); *G11B 27/005* (2013.01); *H04R 3/00* (2013.01); *H04R 3/04* (2013.01); *G10H 2210/211* (2013.01); *G10H 2210/241* (2013.01); *G10H 2210/325* (2013.01); *G10H 2250/035* (2013.01); *G11B 2020/10592* (2013.01)

(58) Field of Classification Search
CPC .......... G10H 1/0041; G10H 2250/035; G10H 2210/241; G10H 1/0091; G10H 1/46; G10H 2210/211; G10H 2210/325; H04R 3/00; H04R 3/04; G06F 17/00; G11B 27/038; G11B 2020/10592; G11B 27/005
See application file for complete search history.

(56) References Cited

U.S. PATENT DOCUMENTS

2016/0295327 A1* 10/2016 Mashita ................ H04R 3/00
2017/0264385 A1* 9/2017 Anderson .............. H04H 60/04

FOREIGN PATENT DOCUMENTS

| JP | 2008039856 A | 2/2008 |
| JP | 2008046370 A | 2/2008 |
| JP | 2009205720 A | 9/2009 |
| JP | 2014203493 A | 10/2014 |

* cited by examiner

*Primary Examiner* — Andrew L Sniezek
(74) *Attorney, Agent, or Firm* — Holtz, Holtz & Volek PC (57) ABSTRACT

A track playback controlling apparatus includes at least one operation receiver, a driver, and a processor. The operation receiver receives operation to change a playback state of a track by a user. The driver causes a physical motion of the operation receiver. The processor changes a state of the motion of the operation receiver in response to a change in the playback state of the track through an operation of the operation receiver.

15 Claims, 4 Drawing Sheets

TRACK PLAYBACK CONTROLLING APPARATUS

CROSS-REFERENCE TO RELATED APPLICATIONS

This application is based upon and claims the benefit of priority from Japanese Patent Application No. 2017-056775 filed on Mar. 23, 2017 the entire contents of which are incorporated herein by reference.

BACKGROUND OF THE INVENTION

1. Field of the Invention

The present invention relates to a track playback controlling apparatus, a method of controlling track playback, and a non-transitory recording medium containing a program for controlling track playback.

2. Description of the Related Art

Traditional apparatuses provide users with information on various operations with light or vibration.

For example, Japanese Unexamined Patent Application Publication No. 2008-39856 discloses an electronic musical instrument which has a chair communicably connected thereto. When a player plays the instrument improperly, the chair vibrates in response to the improper performance.

This apparatus allows the player to recognize his improper performance tactually.

Recently, track playback controlling devices, such as DJ controlling units, have been developed so that users can enjoy disc jockey (DJ) experience easily.

Remixing tracks or outputting remixed tracks using these DJ controlling units requires pitch matching of connected tracks for a natural and seamless transition.

In details, the sound of a track played back on a turn table is output to a monitoring speaker, while the sound of a track played back on another turn table is output to a headphone, to match the pitches and the first beat timings of these tracks.

This kind of pitch matching is basic techniques for DJs to switch multiple tracks naturally and a real joy of disc jockey.

SUMMARY OF THE INVENTION

According to an embodiment of the present invention, a track playback controlling apparatus includes: at least one operation receiver receiving operation to change a playback state of a track by a user; a driver causing a physical motion of the operation receiver; and a processor changing a state of the motion of the operation receiver in response to a change in the playback state of the track through an operation of the operation receiver.

According to another embodiment of the present invention, a method of controlling track playback, the method includes: changing a playback state of a track in response to an operation of an operation receiver by a user; detecting a change in the playback state of the track through an operation of the operation receiver; and changing a state of physical motion of the operation receiver in response to the detected change in the playback state of the track, the physical motion being caused by a driver.

According to another embodiment of the present invention, a non-transitory recording medium containing a program instructing a computer to: change a playback state of a track in response to an operation of an operation receiver by a user; detect a change in the playback state of the track through an operation of the operation receiver; and change a state of physical motion of the operation receiver in response to the detected change in the playback state of the track, the physical motion being caused by a driver.

DETAILED DESCRIPTION OF THE PREFERRED EMBODIMENTS

A track playback controlling apparatus, method of controlling track playback, and a non-transitory recording medium containing a program for controlling track playback according to embodiments of the present invention will now be described with reference to FIG. 1 to FIG. 5.

The following embodiments involve various technically preferred limitations for accomplishing the present invention. The scope of the invention, however, should not be limited to the embodiments and drawings.

<Entire Configuration>

Figure 1:
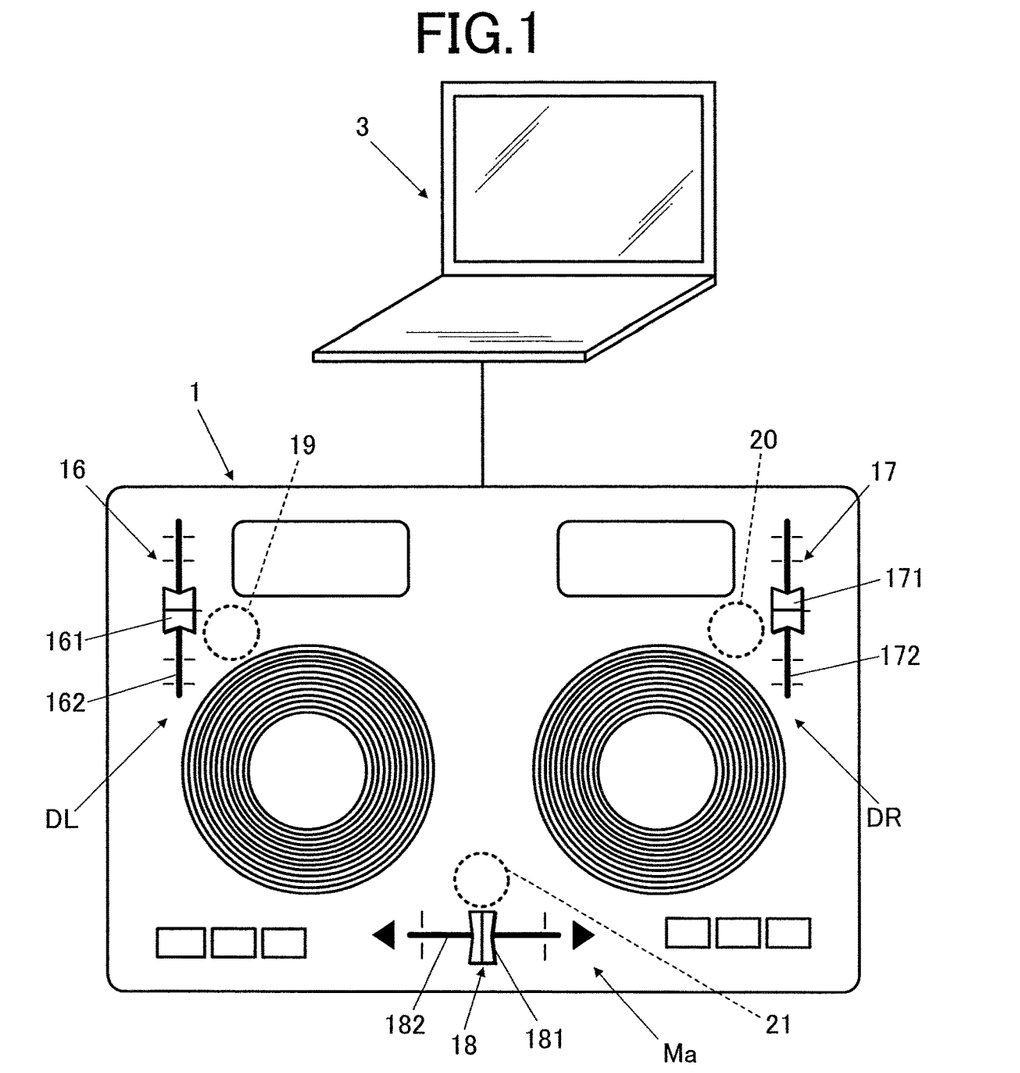
FIG. 1 schematically illustrates a configuration of a track playback controlling apparatus and a terminal device according to this embodiment

FIG. 1 schematically illustrates a configuration of a DJ controlling unit 1, which is a track playback controlling apparatus according to this embodiment, and a terminal device 3 connected thereto.

In this embodiment, the DJ controlling unit 1, which controls the playback of a track, and the terminal device 3, which contains track source data, constitute a track playback system.

<Configuration of Track Playback Controlling Apparatus>

As described above, the track playback controlling apparatus according to this embodiment is the DJ controlling unit 1.

The DJ controlling unit 1 is a single electronic device that can perform the function similar to that of a traditional analog DJ table that includes two decks, each having a turn table, and a mixer.

With reference to FIG. 1, the DJ controlling unit 1 according to this embodiment includes a deck area DL on the left, a deck area DR on the right, and a mixer area Ma between the two deck areas DL and DR. The deck area DL, the deck area DR, and the mixer area Ma correspond to two decks and a mixer in the analog DJ table, respectively.

As described below, the DJ controlling unit 1 can play back multiple tracks concurrently based on track source data received from the terminal device 3. The deck areas DL and DR each correspond to a different track.

In the following description, the deck area DL corresponds to a track A and the deck area DR corresponds to a track B.

Although the DJ controlling unit 1 is equipped with a power button and various operation buttons besides the items illustrated in FIG. 1, the illustration and description of those irrelevant to this embodiment are omitted.

The deck area DL includes a left pitch fader 16 for adjusting the playback timing of the track A. The left pitch fader 16 is an operation receiver used by a user to playback the track.

The playback timing according to this embodiment includes a playback pitch (a track speed or beats per minute (BPM)) and beat positions. Acquisition of information not only on pitches but also on the first beats enables a natural and smooth switching of tracks output (or played back) from a speaker 14 (see FIG. 3).

The left pitch fader 16 includes a knob 161 for adjusting the playback timing of the track A and a slide rail 162 for sliding the knob 161. For example, as the knob 161 is slid upward in FIG. 1, the left pitch fader 16 has a faster playback pitch. As the knob 161 is slid downward, the left pitch fader 16 has a lower playback pitch.

The deck area DR includes a right pitch fader 17 for adjusting the playback timing of the track B. The right pitch fader 17 is an operation receiver used by a user to playback the track.

The right pitch fader 17 includes a knob 171 for adjusting the playback timing of the track B and a slide rail 172 for sliding the knob 171. Just as the left pitch fader 16, the right pitch fader 17 has a faster playback pitch as the knob 171 is slid upward in FIG. 1 and has a lower playback pitch as the knob 171 is slid downward.

The mixer area Ma is provided with a cross fader 18 that functions as an operation receiver to balance the volumes of multiple tracks.

The cross fader 18 includes a knob 181 for adjusting the balance of volumes of the tracks A and B and a slide rail 182 for sliding the knob 181.

For example, as the knob 181 is slid leftward in FIG. 1, the cross fader 18 according to this embodiment has an increased volume of the track A and a decreased volume of the track B. No sound is emitted from the track B when the knob 181 is at the leftmost position.

Similarly, as the knob 181 is slid rightward, the cross fader 18 has an increased volume of the track B and a decreased volume of the track A. No sound is emitted from track A when the knob 181 is at the rightmost position.

When the knob 181 is positioned substantially at the middle of the slide rail 182, the track A has a volume substantially identical to that of the track B.

As shown by the broken lines in FIG. 1, a left vibrator 19, a right vibrator 20, and a cross vibrator 21 are disposed in the vicinity of the left pitch fader 16, the right pitch fader 17, and the cross fader 18, respectively, inside the DJ controlling unit 1. The left vibrator 19, the right vibrator 20, and the cross vibrator 21 transmit vibrations to the knobs 161, 171, and 181, respectively.

The left vibrator 19, the right vibrator 20, and the cross vibrator 21 are vibration generating means that cause motion of respective operation receivers for notifying a user of the operational states of the operation receivers. More specifically, these vibrators according to this embodiment vibrate the respective operation receivers. The left vibrator 19, the right vibrator 20, and the cross vibrator 21 are each preferably a small actuator, for example, a piezoelectric element or a motor.

The left vibrator 19, the right vibrator 20, and the cross vibrator 21 according to this embodiment transmit the vibrations to the respective operation receivers, i.e., the knobs 161, 171, and 181 of the left pitch fader 16, the right pitch fader 17, and the cross fader 18.

The left vibrator 19, the right vibrator 20, and the cross vibrator 21 may have any configuration that can transmit vibrations, other than the above exemplary configuration.

The left vibrator 19, the right vibrator 20, and the cross vibrator 21 each generate vibrations at the playback timings (including playback pitches) of the track A and the track B. The playback pitches are adjusted by the left pitch fader 16 and the right pitch fader 17 in response to control (described below) of the vibration controller 113.

Figure 2:
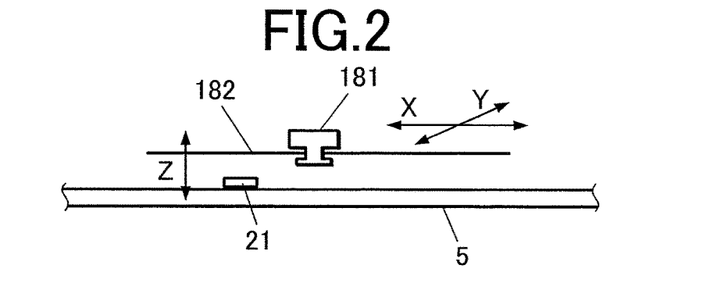
FIG. 2 is a fragmentary block diagram of a control configuration of the track playback controlling apparatus and the terminal device according to this embodiment.

FIG. 2 schematically illustrates the positional relationship between the cross fader 18 and the cross vibrator 21. Although the cross fader 18 and the cross vibrator 21 are illustrated in FIG. 2, the same positional relationship is applied to the right pitch fader 17 and the right vibrator 20 and to the left pitch fader 16 and the left vibrator 19.

As shown in FIG. 2, a substrate 5 is disposed below the cross fader 18. The cross vibrator 21 is disposed on the substrate 5 and below or in the vicinity of the cross fader 18.

Besides the exemplary positon shown in the drawing, the cross vibrator 21 may be disposed at any position where vibrations propagate to the tips of fingers when a user touches the knob 181 of the cross fader 18.

The vibration generating means, i.e., the left vibrator 19, the right vibrator 20, and the cross vibrator 21 according to this embodiment vibrate the operation receivers, i.e., the left pitch fader 16, the right pitch fader 17, and the cross fader 18 (more specifically, the knobs 161, 171, and 181), respectively, in a direction other than the directions of these operation receivers slid by a user to play back tracks.

In details, if the knob 181 of the cross fader 18 (operation receiver) is slid along the X-Y plane, as shown in FIG. 2, the cross vibrator 21 (vibration generating means) vibrates the knob 181 in the height (vertical) or Z direction, perpendicular to the X-Y plane.

The vibration of the operation receiver (more specifically, the knob 181 of the cross fader 18) in a direction different from the sliding direction of the operation receiver facilitates the detection of vibration and its strength by the user.

<Control Configuration>

Figure 3:
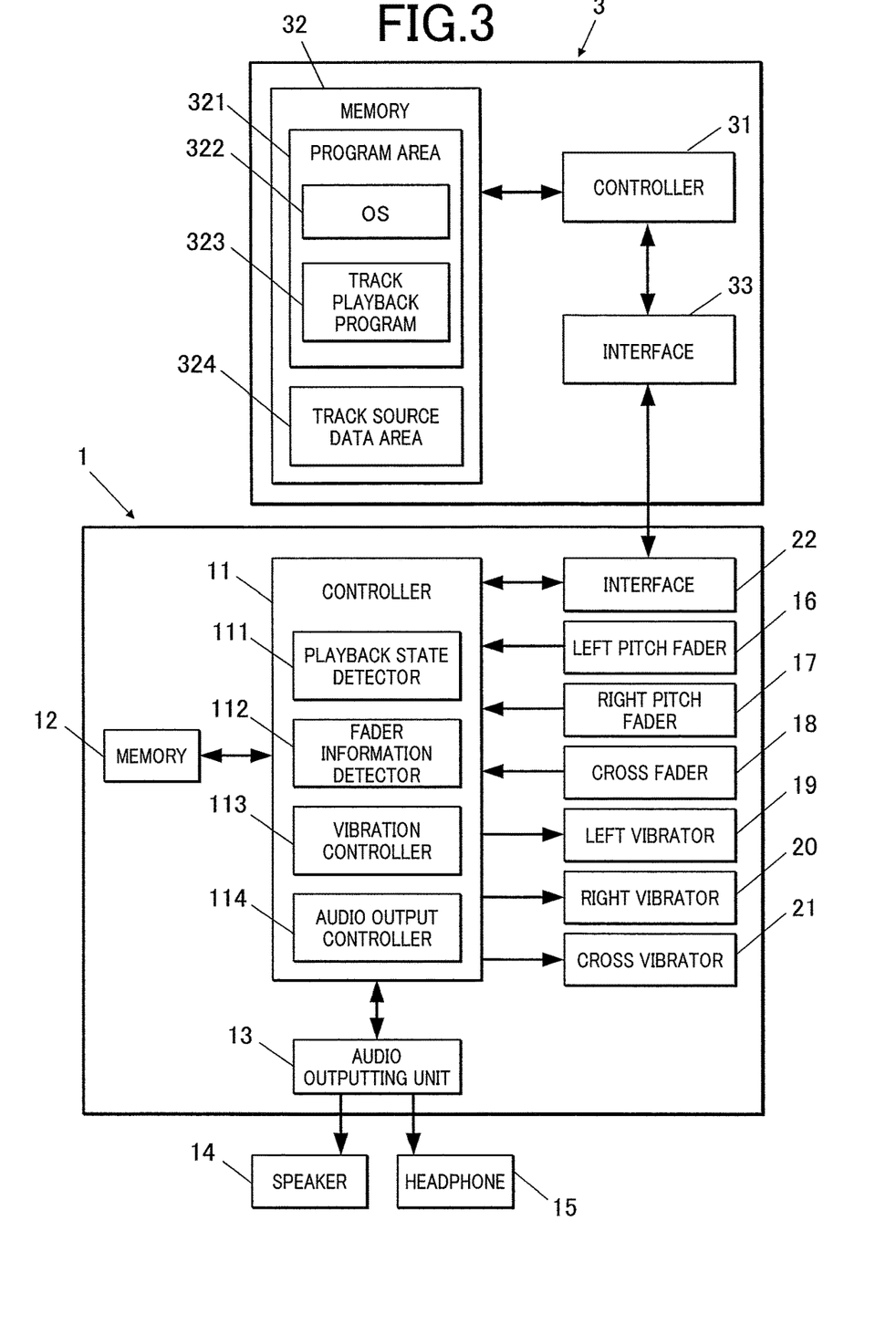
FIG. 3 illustrates a positional relationship between operation receivers and vibration generating means.

FIG. 3 is a fragmentary block diagram of a control configuration of the DJ controlling unit 1 and the terminal device 3.

As shown in FIG. 3, the DJ controlling unit 1 includes a controller 11 and a memory 12.

The controller 11 according to this embodiment includes processing ICs, such as LSIs and CPUs.

The memory 12 contains information necessary for the controller 11 to perform various functions.

In this embodiment, analytical information, such as a track pitch, is output from the terminal device 3, in other words, the controller 11 of the DJ controlling unit 1 does not analyze tracks.

The processing ICs, such as LSIs and CPUs, implement various functions as a multiplexer and the like.

The controller 11 may have any other configuration. For example, the controller 11 may include multiple discrete ICs having various functions. In this case the controller 11 can be provided at a lower price.

The controller 11 according to this embodiment functions as a playback state detector ill, a fader information detector 112, a vibration controller 113, and an audio output controller 114.

The playback state detector 111 is a playback state detecting means for acquiring analytical information on tracks.

In this embodiment, the terminal device 3 can send track source data of each track to the DJ controlling unit 1, as described above. The playback state detector 111 acquires analytical information associated with the track source data, including playback timing such as a playback pitch.

The playback state detector 111 (playback state detecting means) analyzes a track being played back in the DJ controlling unit 1 to acquire analytical information on the played-back track. For example, the playback state detector 111 acquires information on the playback timing of a track being played back as analytical information on the played-back track.

When a user operates the left pitch fader 16 or the right pitch fader 17, the playback timing of the track being played back changes depending on the operation on the left pitch fader 16 or the right pitch fader 17. The playback state detector 111 detects such changes in the playback timing of the track being played back, as needed.

The playback state detector 111 (playback state detecting means) may determine the playback state of a track being played back by analyzing the details in the information, such as melody, code, and bar, included in the track data stored for a portion being played back; MIDI data output for a portion being played back; or audio waveform data output for a portion being played back.

The fader information detector 112 detects information on the operational states of the left pitch fader 16, the right pitch fader 17, and the cross fader 18, i.e., the positions of the knobs 161, 171, and 181.

The cross fader 18, for example, changes the volume using a variable resistor. The fader information detector 112 monitors a divided voltage (voltage) determined by the variable resistor, which changes depending on the operation of the knob 181, to detect the position of the knob 181.

In the embodiment described below, the divided voltage (voltage: AD value) of the cross fader 18 is referred to as "VCF" (see FIGS. 4 and 5).

The vibration controller 113 is a vibration controlling means that sends a control signal to the vibration generating means, i.e., the left vibrator 19, the right vibrator 20, and the cross vibrator 21, depending on the playback state of a track acquired by the playback state detector 111 (playback state detecting means), to control their operations.

The playback state detector 111 according to this embodiment acquires information on the playback timings of the tracks being played back. The vibration controller 113 controls the operations of the left vibrator 19, the right vibrator 20, and the cross vibrator 21 based on the playback timings of the tracks being played back.

For example, the vibration controller 113 instructs the left vibrator 19, the right vibrator 20, and the cross vibrator 21 to vibrate or not to vibrate the left pitch fader 16, the right pitch fader 17, and the cross fader 18 (more specifically, the knobs 161, 171, and 181), respectively, or to change the strength of the generated vibrations at a cycle corresponding to the playback timings of the tracks being played back acquired by the playback state detector 111. In other words, for example, if the playback pitch of the track A operated by the left pitch fader 16 matches that of the track B operated by the right pitch fader 17, the vibration controller 113 instructs the left vibrator 19 and the right vibrator 20 not to vibrate the respective pitch faders. If the playback timings are significantly deviated, the vibration controller 113 may instruct the left vibrator 19 and the right vibrator 20 to vibrate the respective pitch faders significantly.

An operation receiver according to this embodiment (for example, the cross fader 18) can operate multiple tracks concurrently played back. The vibration controller 113 controls a vibration generating means (for example, the cross vibrator 21) to vibrate the corresponding operation receiver (for example, the knob 181 of the cross fader 18) in response to the playback timings of multiple tracks.

The DJ controlling unit 1 according to this embodiment is provided with the multiple operation receivers (for example, the left pitch fader 16 and the right pitch fader 17). These operation receivers each operate the playback timing of multiple tracks independently. The vibration controller 113 controls each vibration generating means (for example, the left vibrator 19 or the right vibrator 20) to vibrate the corresponding operation receiver (for example, the left pitch fader 16 or the right pitch fader 17) at a cycle corresponding to the playback timing of the track operated by each operation receiver (for example, the track A for the left pitch fader 16 and the track B for the right pitch fader 17).

Depending on the level of gap in the playback timings of the multiple tracks, the vibration controller 113 may control the left vibrator 19, the right vibrator 20, and the cross vibrator 21 to change at least one of the strength, cycle, and direction of vibrations of the left pitch fader 16, the right pitch fader 17, and the cross fader 18 (more specifically, the knobs 161, 171, and 181).

If one of multiple tracks (for example, the track A) is played back with sound while another track (for example, the track B) is played back in mute, the vibration controller 113 may control the vibration generating means (the right vibrator 20 and the cross vibrator 21) to vibrate operation receivers (for example, the right pitch fader 17 and the cross fader 18), depending on the playback timing of the track played back in mute (in this case, the track B).

A DJ needs to exactly match a playback pitch to the pitch of a track to be played back with sound after switching, i.e., the track currently in mute (in this example, the track B). Vibration of operation receivers (for example, the right pitch fader 17 and the cross fader 18) depending on the information on the playback timing of the track (in this example, the track B) calls user's attention to pitch matching effectively.

For the cross fader 18 (operation receiver), which adjusts the balance between the volumes of the multiple tracks, the vibration controller 113 may control a vibration generating means (i.e., the cross vibrator 21) to vibrate or cause motion of the operation receiver (i.e., the cross fader 18) in response to an adjusted amount of volume balance at a cycle corresponding to the playback timing of either one of the tracks.

For example, if the track A has a higher volume in this embodiment, the corresponding operation receiver (i.e., the cross fader 18) is vibrated at a cycle corresponding to the playback timing of the track A the playback pitch of which is operated by the left pitch fader 16. If the track B has a higher volume in this embodiment, the corresponding operation receiver (i.e., the cross fader 18) is vibrated at a cycle corresponding to the playback timing of the track B the playback pitch of which is operated by the right pitch fader 17.

The audio output controller 114 controls an audio outputting unit 13 to output the sound of a track from the speaker 14 or the headphone 15.

The audio output controller 114 controls a track (the track A or the track B in this embodiment) output from the speaker 14 via the audio outputting unit 13 and the playback pitch or volume of the output track in response to the operations of the left pitch fader 16, the right pitch fader 17, and the cross fader 18.

The DJ controlling unit 1 according to this embodiment is connected to the terminal device 3 via an interface 22.

The terminal device 3 is, for example, a personal computer, as shown in FIG. 1.

The terminal device 3 may be a portable terminal device or a tablet computer, besides the personal computer.

The terminal device 3 includes a controller 31, a memory 32, and an interface 33 connected to the DJ controlling unit 1.

The DJ controlling unit 1 may be connected to the terminal device 3 in any form, for example, through a wired connection via USB or through a wireless connection in accordance with various standards.

The controller 31 of the terminal device 3 controls various units in collaboration with an OS 322 stored in a program area 321 of the memory 32.

In this embodiment, a music playback program 323 is an application program stored in the program area 321 to control the playback of a track in collaboration with the DJ controlling unit 1.

The memory 32 has a track source data area 324. The track source data area 324 contains track source data and analytical information associated with each track (for example, data on playback timing, such as a playback pitch).

In this embodiment, the controller 31 of the terminal device 3 analyzes tracks and the track source data area 324 of the terminal device 3 contains track source data and analytical information for each track, as described above.

The track source data and analytical information for each track is sent to the DJ controlling unit 1, as needed, in response to a request of the DJ controlling unit 1.

<Operation of Track Playback Controlling Apparatus>

The operation of the DJ controlling unit 1, a track playback controlling apparatus according to this embodiment, will now be explained.

Figure 4:
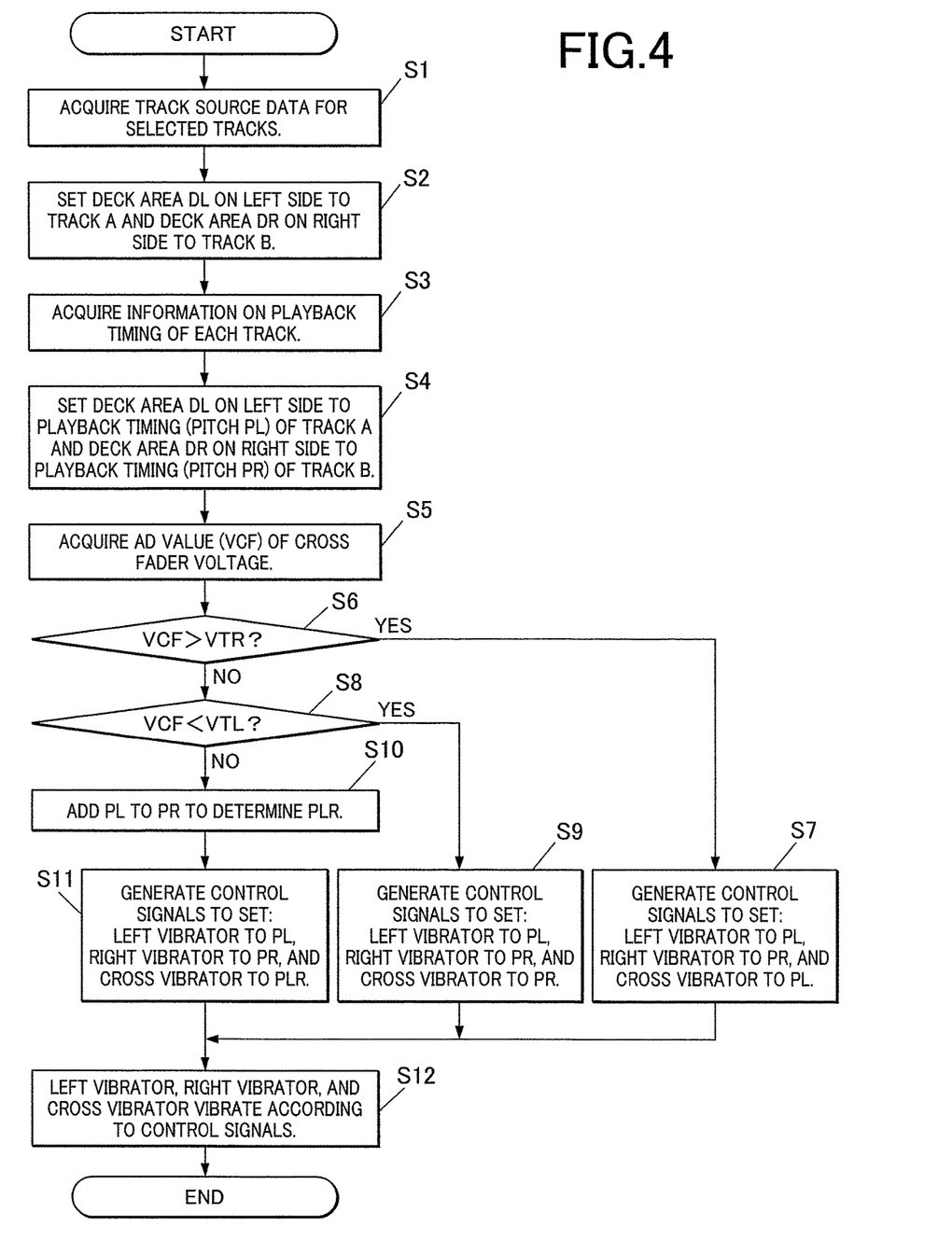
FIG. 4 is a flowchart illustrating a track playback controlling process according to this embodiment.

FIG. 4 is a flow chart illustrating a track playback controlling process of the DJ controlling unit 1 according to this embodiment.

As shown in FIG. 4, the track playback controlling process of the DJ controlling unit 1 is performed as follows: A user selects a track corresponding to the deck area DL (for example, the track A) and a track corresponding to the deck area DR (for example, the track B) and the DJ controlling unit 1 acquires the track source data for the selected tracks from the terminal device 3 (Step S1).

The controller 11 of the DJ controlling unit 1 makes the user-selected tracks correspond to the deck area DL and the deck area DR (Step S2). In this embodiment, the track A corresponds to the left deck area DL and the track B corresponds to the right deck area DR. The playback state detector 111 acquires the information on the playback timing, such as a playback pitch, of each track as analytical information on the played-back track (Step S3).

The controller 11 sets the playback timing (pitch PL) of the track A for the deck area DL and the playback timing (pitch PR) of the track B for the deck area DR (Step S4).

The controller 11 also acquires the voltage AD value (VCF) of the cross fader 18 (Step S5).

The controller 11 acquires the playback state of each track (the state of the volume adjustment of each track by the cross fader 18) based on the voltage AD value (VCF) of the cross fader 18. The vibration controller 113 controls the operations of the left vibrator 19, the right vibrator 20, and the cross vibrator 21 based on the acquired playback state of each track.

Figure 5:
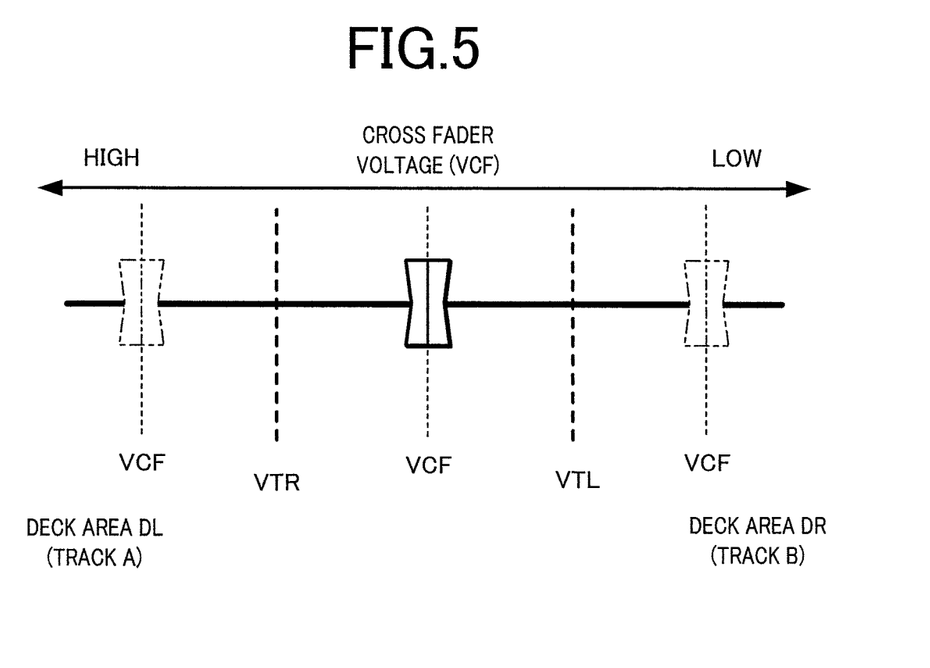
FIG. 5 schematically illustrates the relationship between voltage of cross fader (VCF) and the playback state of each track.

FIG. 5 schematically illustrates the relationship between the voltage (VCF) of the cross fader 18 determined by the variable resistor and the playback state of each track.

The cross fader 18 according to this embodiment has the largest VCF when the knob 181 is at the leftmost position of the slide rail 182. In this state, the track A on the deck area DL has a maximum volume, while the track B on the deck area DR is muted. In contrast, the cross fader 18 has the smallest VCF when the knob 181 is at the rightmost position of the slide rail 182. In this state, the track B on the deck area DR has a maximum volume, while the track A on the deck area DL is muted. When the knob 181 is positioned between the left and right ends of the slide rail 182, the volumes of the track A and the track B increase or decrease linearly according to the position of the knob 181. When the knob 181 is positioned in the middle of the slide rail 182, the volumes of the track A and the track B are identical.

The position of the knob 181 of the cross fader 18 and changes in the volumes of the track A and the track B may have any other relationship. For example, either one of the tracks may have a maximum volume until the knob 181 reaches a certain point corresponding a threshold, at which the track is muted and the other track has a maximum volume.

The VTR in FIG. 5 is a threshold of the volume of the track A on the deck area DL and the VTL is a threshold of the volume of the track B on the deck area DR, where the cross fader 18 determines whether these thresholds are each greater than or equal to a certain level.

As shown in FIG. 4, the vibration controller 113 determines which track, the track A on the deck area DL or the track B on the deck area DR, is output with sound, i.e., the VCF is greater than or equal to a predetermined threshold VTR on the left (Step S6).

If the VCF is greater than or equal to the threshold VTR (Step S6: YES), the vibration controller 113 determines that the track A is mainly output with sound and generates control signals instructing the left vibrator 19 to vibrate the left pitch fader 16 at a cycle corresponding to the playback timing (pitch PL) of the track A, the right vibrator 20 to vibrate the right pitch fader 17 at a cycle corresponding to the playback timing (pitch PR) of the track B, and the cross vibrator 21 to vibrate the cross fader 18 at a cycle corresponding to the playback timing (pitch PL) of the track A (Step S7). The vibration controller outputs these control signals to the left vibrator 19, the right vibrator 20, and the cross vibrator 21, respectively.

These control signals cause the left vibrator 19 to vibrate at a cycle corresponding to the playback timing (pitch PL) of the track A, the right vibrator 20 to vibrate at a cycle corresponding to the playback timing (pitch PR) of the track B, and the cross vibrator 21 to vibrate at a cycle corresponding to the playback timing (pitch PL) of the track A (Step S12).

If the VCF is not greater than or equal to the threshold VTR (Step S6: NO), the vibration controller 113 further determines whether the VCF is less than or equal to a predetermined threshold VTL on the right (Step S8).

If the VCF is less than or equal to the threshold VTL (Step S8: YES), the vibration controller 113 determines that the track B is mainly output with sound and generates control signals instructing the left vibrator 19 to vibrate the left pitch fader 16 at a cycle corresponding to the playback timing (pitch PL) of the track A, the right vibrator 20 to vibrate the right pitch fader 17 at a cycle corresponding to the playback timing (pitch PR) of the track B, and the cross vibrator 21 to vibrate the cross fader 18 at a cycle corresponding to the playback timing (pitch PR) of the track B (Step S9). The vibration controller outputs these control signals to the left vibrator 19, the right vibrator 20, and the cross vibrator 21, respectively.

These control signals cause the left vibrator 19 to vibrate at a cycle corresponding to the playback timing (pitch PL)

of the track A, the right vibrator 20 to vibrate at a cycle corresponding to the playback timing (pitch PR) of the track B, and the cross vibrator 21 to vibrate at a cycle corresponding to the playback timing (pitch PR) of the track B (Step S12).

If the VCF is not greater than or equal to the threshold VTR and is not less than or equal to the threshold VTL (Step S6: NO and Step S8: NO), the vibration controller 113 determines that the track A and the track B have identical volumes (Step S10) and generates control signals instructing the left vibrator 19 to vibrate the left pitch fader 16 at a cycle corresponding to the playback timing (pitch PL) of the track A, the right vibrator 20 to vibrate the right pitch fader 17 at a cycle corresponding to the playback timing (pitch PR) of the track B, and the cross vibrator 21 to vibrate the cross fader 18 at a cycle corresponding to a pitch PLR determined by adding the playback timing (pitch PL) of the track A to that (pitch PR) of the track B (Step S11) The vibration controller outputs these control signals to the left vibrator 19, the right vibrator 20, and the cross vibrator 21, respectively.

These control signals cause the left vibrator 19 to vibrate at a cycle corresponding to the playback timing (pitch PL) of the track A, the right vibrator 20 to vibrate at a cycle corresponding to the playback timing (pitch PR) of the track B, and the cross vibrator 21 to vibrate at a cycle corresponding to the playback timing (pitch PLR) of the track A and the track B (Step S12). If the playback timing (pitch PR) of the track B matches that (pitch PL) of the track A, then the knob 181 of the cross fader 18 vibrates at a cycle that causes no sense of discomfort even if the tracks overlap; otherwise, the knob 181 vibrates irregularly at a cycle that causes a sense of discomfort. This allows the user to tactually recognize a gap in playback timings between the track A and the track B.

<Effect of Track Playback Controlling Apparatus>

As described above, the track playback controlling apparatus according to this embodiment controls the operations of the vibration generating means, i.e., the left vibrator 19, the right vibrator 20, and the cross vibrator 21, which vibrate the left pitch fader 16, the right pitch fader 17, and the cross fader 18 (operation receivers), respectively, in response to the playback state of each track.

This allows a user to feel vibrations tactually, not aurally or visually, to recognize the playback timings of the track A and the track B. This ensures that a user who is not accustomed to pitch matching can recognize the playback pitch of a track intuitively, enabling easy and smooth pitch matching.

A DJ is expected to work in an environment surrounded by sounds, various lighting apparatus, and the like. In such circumstances, vibrations propagating to the fingers allows the DJ to know the playback timing, such as a playback pitch, of the track easily.

The playback state detector 111 according to this embodiment acquires information on the playback timing of the track being played back. The vibration controlling means controls the operations of the left vibrator 19, the right vibrator 20, and the cross vibrator 21 based on the acquired information. This allows the user to intuitively know through vibrations propagating to the fingers whether or not the adjustment of a playback timing (or a playback pitch) that the user has performed using the left pitch fader 16 and the right pitch fader 17 (operation receivers) is a proper pitch-matching operation. As a result, the user is expected to acquire pitch matching techniques.

In this embodiment, the vibration generating means, (i.e., the left vibrator 19, the right vibrator 20, and the cross vibrator 21) vibrate the respective operation receivers (i.e., the left pitch fader 16, the right pitch fader 17, and the cross fader 18) in a direction different from the direction in which a user slides these operation receivers for track playback operations. This allows the user to feel the vibrations caused by the left vibrator 19, the right vibrator 20, and the cross vibrator 21 more clearly.

When multiple tracks (for example, the track A and the track B) are played back concurrently, just as in this embodiment, each operation receiver used to operate the corresponding track is vibrated in response to the playback timing of the track. This allows the user to be informed of which track being played back has a deviated playback timing (a deviated playback pitch) properly.

The track playback controlling apparatus according to this embodiment includes the cross fader 18, which is an operation receiver used to adjust the balance between the volumes of the multiple tracks concurrently placed back. The vibration controller 113 vibrates or causes motion of the operation receiver (the cross fader 18) at a cycle corresponding to the playback timing of either one of the tracks, depending on the volume balance adjusted by the cross fader 18 (i.e, the voltage (VCF) of the cross fader 18 in this embodiment). This allows the user to switch or connect tracks properly while confirming the playback pitches through the vibrations propagating to the fingers.

If the vibration controller 113 controls the vibration generating means (the cross vibrator 21) so as to vibrate the corresponding operation receiver (the cross fader 18) at least in response to the playback timing of the track played back in mute during play backing of one of the tracks with sound and mute of the other track, the user can adjust the playback timing to the playback timing, such as a playback pitch, of a switching-destination track in response to the vibrations felt at the fingers. This facilitates pitch matching.

<Variations>

Although the embodiment of the present invention has been described above, it should be understood that the embodiment should not be construed to limit the present invention and may be appropriately modified without departing from the scope of the present invention.

In the above embodiment, the DJ controlling unit 1, a track playback controlling apparatus, is connected to the terminal device 3 to analyze tracks. Alternatively, any device other than the terminal device 3 may analyze the tracks.

For example, the playback state detector 111 of the controller 11 of the DJ controlling unit 1 may analyze the tracks.

In this case, the track playback control may be completed only at the DJ controlling unit 1; hence, the terminal device 3 may be omitted.

In the above embodiment, the track source data is stored in the memory 32 of the terminal device 3. Alternatively, the track source data the playback of which is controlled by the DJ controlling unit 1, a track playback controlling apparatus, may be stored in any other location.

For example, the DJ controlling unit 1 may be provided with a memory for storing the track source data. Alternatively, track source data is not stored at all and data stored in external servers may be downloaded, as needed, via a network for use as track source data. Alternatively, source data stored in USB memory sticks, memory storage, such as cards or chips, or CD-ROMs, may be read into the memory 12 of the DJ controlling unit 1, a track playback controlling apparatus, for use as source data.

In this case, the downloaded track source data may be analyzed at the controller 11 of the DJ controlling unit 1.

In the above embodiment, digital source data stored in the memory 32 of the terminal device 3 is used for track playback control. Alternatively, non-digital source data may be used.

For example, a DJ device equipped with a turn table to play back analog records may include the track playback controlling apparatus according to the present invention as a mixer for mixing tracks.

In this case, a track analyzer is provided in the controller of the track playback controlling apparatus to analyze analog records and vibrates the knob of the cross fader (operation receiver) based on the analytical results at a cycle corresponding to the playback timing, such as a playback pitch, of a track.

Application of the present invention to the playback of analog records allows the operation receiver to be vibrated in response to the playback timing, such as a playback pitch, of a track. This helps users acquire pitch matching techniques.

The vibration controller 113 may control the vibration generating means, i.e., the left vibrator 19, the right vibrator 20, and the cross vibrator 21 not to vibrate, depending on playback timing of a track being played back determined by the playback state detector 111.

For example, if two tracks that requires pitch matching has no gap in pitches, the vibration controller 113 may notify the user of the matched pitches by not generating vibrations.

Depending on the level of the gap in the playback timings (pitches) of two tracks that requires pitch matching, the vibration controller 113 may control the left vibrator 19, the right vibrator 20, and the cross vibrator 21 to change at least one of the strength, cycle, and direction of vibrations of the multiple operation receivers.

Variation in vibrations depending on the level of the gap in the playback timings (pitches) allows the user to intuitively feel the gap in pitches, facilitating a pitch matching.

The vibration controller 113 need not generate vibrations at a plain rhythm and may add emphasis to the strength of vibrations. For example, the vibration controller 113 generates a strong vibration corresponding to the first beat of a 4-beat track or generates vibrations corresponding to the first and third beats of a 4-beat track and no vibrations corresponding to the second and fourth beats.

Besides pitch matching, first-beat matching is also important for smooth switching between and remixing of tracks. Variation in the strength of vibrations, as shown above, facilitates both the pitch matching and first-beat matching.

The vibration generating means, i.e., the left vibrator 19, the right vibrator 20, and the cross vibrator 21 do not necessarily vibrate the operation receivers (the left pitch fader 16, the right pitch fader 17, and the cross fader 18) to notify a user of the operational states of the operation receivers. Alternatively, the vibration generating means may cause motion of the operation receivers.

For example, the left vibrator 19, the right vibrator 20, and the cross vibrator 21 may cause motion of the operation receivers (the left pitch fader 16, the right pitch fader 17, and the cross fader 18) only once.

Even a single motion of the operation receivers allows the user to intuitively know the playback timing, such as a pitch, of a track tactually.

In the above embodiment, the playback timing, such as a pitch, of a track is notified through vibrations of the vibration generating means. Alternatively, any other means may be used to inform the user of the playback timing, such as a pitch, of a track.

For example, blinking of light from a light emitter, such as an LED, may be used to inform the user of the playback timing, such as a pitch, of a track.

The means for notifying the user of the playback timing, such as a pitch, of a track using light may be combined with that using vibrations generated by the vibration generating means according to the above embodiment.

Notifying the user of the playback timing, such as a pitch, of a track by various means other than sound, such as vibrations and light, ensures that the user can recognize the playback timing, facilitating pitch matching.

In the above embodiment, the vibrators are used to vibrate the operation receivers. Alternatively, a driver, such as an actuator, may be used to cause a physical motion of the operation receivers. In this case, the operation receivers may move once in one direction or irregularly.

The controller in the above embodiment, which performs various control operations, includes the CPU (a general processor), which executes programs stored in ROM (memory). Alternatively, the controller may include dedicated processors each performing its own control operations. In this case, each dedicated processor may include a general processor (electronic circuit) capable of executing programs and a memory containing dedicated control programs or include dedicated electronic circuits each dedicated to control.

The apparatus necessary to cause the various effects described above may have any configuration other than those described above. For example, the apparatus may have the following configuration:

CONFIGURATION EXAMPLE 1

A track playback controlling apparatus is configured to have: at least one operation receiver receiving operation to change a playback state of a track by a user; a driver causing a physical motion of the operation receiver; and a processor changing a state of the motion of the operation receiver in response to a change in the playback state of the track through an operation of the operation receiver.

CONFIGURATION EXAMPLE 2

The track playback controlling apparatus according to the above Configuration Example, the driver further includes a vibrator vibrating the operation receiver, and the processor changes a state of vibrations of the operation receiver in response to a change in the playback state of the track through the operation of the operation receiver, the vibrations being caused by the vibrator.

CONFIGURATION EXAMPLE 3

The track playback controlling apparatus according to any one of the above Configuration Examples, the operation receiver provides an instruction to change a playback timing of the track, and the processor changes the state of the motion of the operation receiver in response to a change in the playback timing of the track in response to the operation of the operation receiver, the motion being caused by the driver.

CONFIGURATION EXAMPLE 4

The track playback controlling apparatus according to any one of the above Configuration Examples, the operation receiver provides an instruction to change a playback cycle or a phase of the track, and the processor changes the state of the motion of the operation receiver in response to the change in the playback cycle or the phase of the track in response to the operation of the operation receiver, the motion being caused by the driver.

CONFIGURATION EXAMPLE 5

The track playback controlling apparatus according to any one of the above Configuration Examples, wherein the processor instructs the vibrator to vibrate or not to vibrate the operation receiver or to change at least one of the strength, cycle, and direction of vibrations of the operation receiver in response to a change in the playback state of the track in response to the operation of the operation receiver, the vibrations being caused by the vibrator.

CONFIGURATION EXAMPLE 6

The track playback controlling apparatus according to any one of the above Configuration Examples, wherein the processor notifies the user of a change in the playback state of the track in response to the operation of the operation receiver by the user by the motion of the operation receiver caused by the driver.

CONFIGURATION EXAMPLE 7

The track playback controlling apparatus according to any one of the above Configuration Examples, wherein the processor analyzes track data of a playback portion of the track during playback of the track to detect the playback state of the track.

CONFIGURATION EXAMPLE 8

The track playback controlling apparatus according to any one of the above Configuration Examples, wherein the processor changes the state of the motion of the operation receiver at the cycle or phase of the track being played back, the motion being caused by the driver.

CONFIGURATION EXAMPLE 9

The track playback controlling apparatus according to any one of the above Configuration Examples, wherein the processor controls to move the operation receiver in a direction different from a direction of the motion of the operation receiver when the user moves the operation receiver to play back the track.

CONFIGURATION EXAMPLE 10

The track playback controlling apparatus according to any one of the above Configuration Examples, wherein the operation receiver concurrently plays back a plurality of tracks, and the processor controls to move the operation receiver in response to the playback timings of the tracks.

CONFIGURATION EXAMPLE 11

The track playback controlling apparatus according to any one of the above Configuration Examples, wherein the at least one operation receiver includes a plurality of operation receivers operating playback timings of the plurality of tracks independently, and the processor controls to move each of the operation receivers at a cycle corresponding to the playback timing of the track.

CONFIGURATION EXAMPLE 12

The track playback controlling apparatus according to any one of the above Configuration Examples, wherein the processor controls to change at least one of the strength, cycle, and direction of motions of the operation receivers depending on a gap in the playback timings of the tracks.

CONFIGURATION EXAMPLE 13

The track playback controlling apparatus according to any one of the above Configuration Examples, wherein one of the tracks is being played back with sound, while another track is played back in mute, and the processor controls to move the operation receiver at least based on information on the playback timing of the track played back in mute.

CONFIGURATION EXAMPLE 14

The track playback controlling apparatus according to any one of the above Configuration Examples, further including an operation receiver adjusting the balance of volumes of the tracks, wherein the processor controls to move or cause the motion of the operation receiver based on an adjusted amount of volume balance at a cycle corresponding to the playback timing of either one of the tracks.

The invention claimed is:

1. A track playback controlling apparatus comprising:
   at least one operation receiver which is operable to receive an operation to change a playback state of a track from a user;
   a driver configured to cause a physical motion of the at least one operation receiver; and
   a processor configured to change a state of the motion of the at least one operation receiver in response to the change in the playback state of the track in response to the operation of the at least one operation receiver,
   wherein the processor analyzes track data of a playback portion of the track to detect the playback state of the track during playback of the track.

2. The track playback controlling apparatus according to claim 1, wherein:
   the driver comprises at least one vibrator configured to vibrate the at least one operation receiver, and
   the processor changes a state of vibrations of the at least one operation receiver in response to the change in the playback state of the track in response to the operation of the at least one operation receiver, the vibrations being caused by the at least one vibrator.

3. The track playback controlling apparatus according to claim 2, wherein the processor instructs the at least one vibrator to vibrate or not to vibrate the at least one operation receiver or to change at least one of a strength, cycle, and direction of vibrations of the at least one operation receiver in response to the change in the playback state of the track in response to the operation of the at least one operation receiver, the vibrations being caused by the at least one vibrator.

4. The track playback controlling apparatus according to claim 1, wherein:

the at least one operation receiver provides an instruction to change a playback timing of the track, and the processor changes the state of the motion of the at least one operation receiver in response to the change in the playback timing of the track in response to the operation of the at least one operation receiver, the motion being caused by the driver.

5. The track playback controlling apparatus according to claim 4, wherein:

the at least one operation receiver provides an instruction to change a playback cycle or a phase of the track, and the processor changes the state of the motion of the at least one operation receiver in response to the change in the playback cycle or the phase of the track in response to the operation of the at least one operation receiver, the motion being caused by the driver.

6. The track playback controlling apparatus according to claim 5, wherein the processor changes the state of the motion of the at least one operation receiver at the playback cycle or the phase of the track being played back, the motion being caused by the driver.

7. The track playback controlling apparatus according to claim 1, wherein the processor notifies the user of the change in the playback state of the track in response to the operation of the at least one operation receiver, by the motion of the at least one operation receiver caused by the driver.

8. The track playback controlling apparatus according to claim 1, wherein the processor controls to move the at least one operation receiver in a direction different from a direction of the motion of the at least one operation receiver when the user moves the at least one operation receiver to operate the at least one operation receiver.

9. The track playback controlling apparatus according to claim 1, wherein:

the at least one operation receiver concurrently plays back a plurality of tracks, and the processor controls to move the at least one operation receiver in response to playback timings of the tracks.

10. The track playback controlling apparatus according to claim 9, wherein:

the at least one operation receiver comprises a plurality of operation receivers which operate the playback timings of the plurality of tracks independently, and the processor controls to move each of the operation receivers at a cycle corresponding to the playback timing of the track operated by the operation receiver.

11. A track playback controlling apparatus comprising:

a plurality of operation receivers, each of the operation receivers being operable to receive an operation to change a playback state of a track from a user, and the plurality of operation receivers being configured to operate playback timings of a plurality of concurrent tracks independently;

a driver configured to cause physical motions of the operation receivers; and a processor configured to change states of the motions of the operation receivers in response to changes in the playbacks states of the tracks in response to operations of the operation receivers, wherein the processor controls the motion of each of at least two of the operation receivers at a cycle corresponding to the playback timing of the track corresponding to the operation receiver, and wherein the processor controls to change at least one of a strength, cycle, and direction of the motions of the operation receivers depending on a gap in the playback timings of the tracks.

12. The track playback controlling apparatus according to claim 11, wherein:

one of the operation receivers is configured to adjust a balance of volumes of the tracks, and the processor controls the motion of the one of the operation receivers based on an adjusted amount of volume balance at a cycle corresponding to the playback timing of either one of the tracks.

13. A track playback controlling apparatus comprising:

at least one operation receiver which is operable to receive an operation to change a playback state of a track from a user;

a driver configured to cause a physical motion of the at least one operation receiver; and a processor configured to change a state of the motion of the at least one operation receiver in response to the change in the playback state of the track in response to the operation of the at least one operation receiver, wherein the at least one operation receiver concurrently plays back a plurality of tracks, wherein the processor controls the motion of the at least one operation receiver in response to playback timings of the tracks, and wherein when one of the tracks is being played back with sound, while another of the tracks is played back in mute, the processor controls to move the at least one operation receiver at least based on information on the playback timing of the track played back in mute.

14. A method of controlling track playback, the method comprising:

changing a playback state of a track in response to an operation of an operation receiver by a user;

detecting a change in the playback state of the track through an operation of the operation receiver;

changing a state of physical motion of the operation receiver in response to the detected change in the playback state of the track, the physical motion being caused by a driver; and analyzing track data of a playback portion of the track to detect the playback state of the track during playback of the track.

15. A non-transitory recording medium containing a program executable by a computer to perform operations comprising:

changing a playback state of a track in response to an operation of an operation receiver by a user;

detecting a change in the playback state of the track through an operation of the operation receiver;

changing a state of physical motion of the operation receiver in response to the detected change in the playback state of the track, the physical motion being caused by a driver; and analyzing track data of a playback portion of the track to detect the playback state of the track during playback of the track.

* * * * *